April 7, 1959 R. E. TROENDLY 2,880,533
ADVERTISING AND DISPLAY DEVICE
Filed March 5, 1957 2 Sheets-Sheet 1
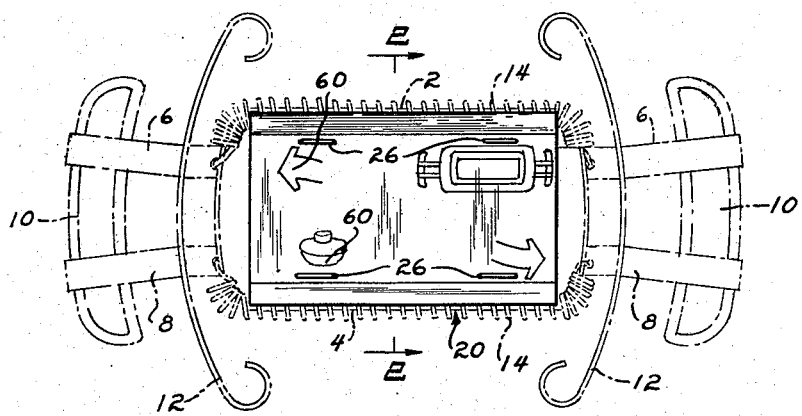
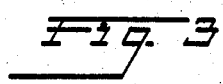 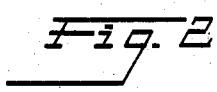
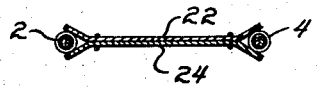
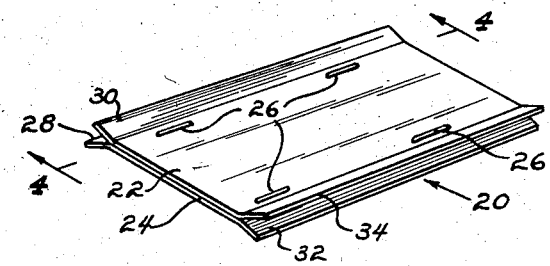 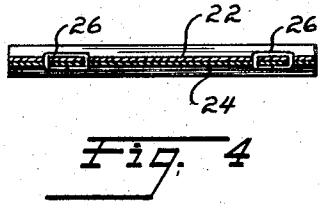
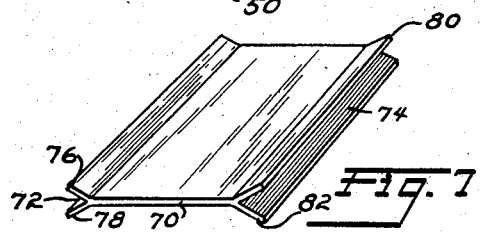
INVENTOR
RAY E TROENDLY
BY Scrivener & Parker
ATTORNEYS

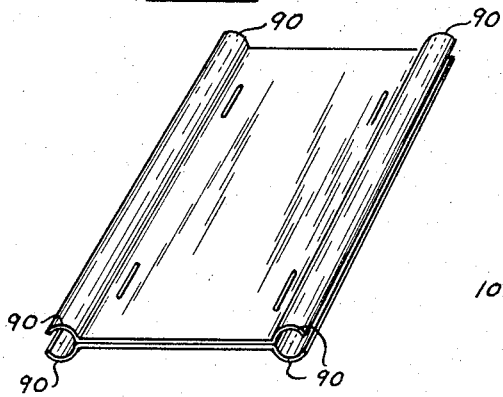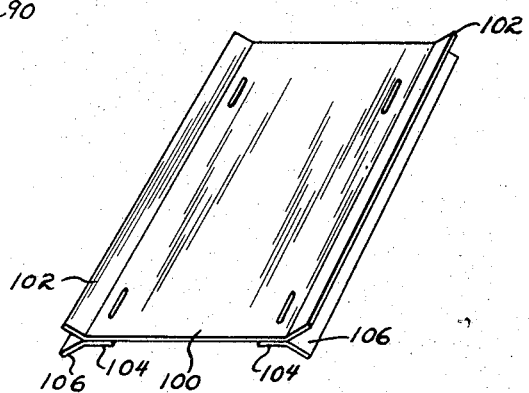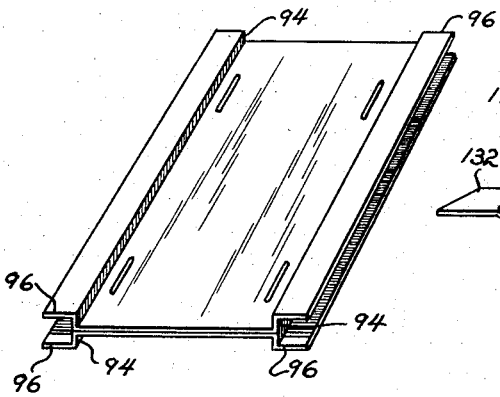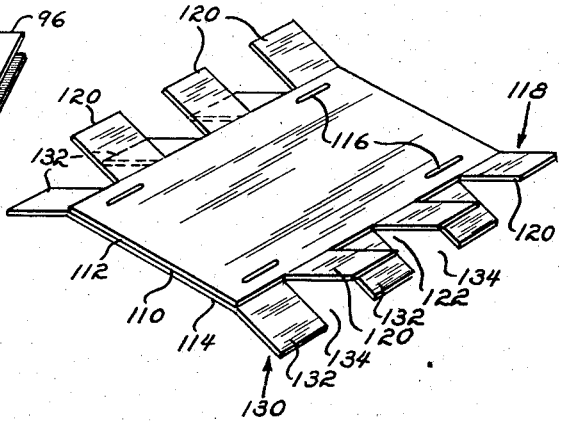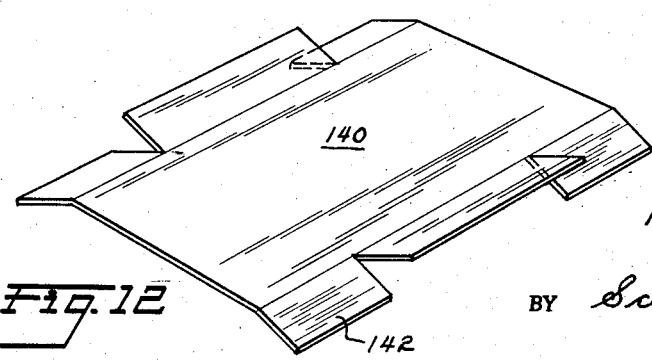

United States Patent Office 2,880,533
Patented Apr. 7, 1959

2,880,533
ADVERTISING AND DISPLAY DEVICE
Ray E. Troendly, Elkton, Oreg., assignor to Troendly Illinois Corporation, Melrose Park, Ill., a corporation of Delaware Application March 5, 1957, Serial No. 644,019

3 Claims. (Cl. 40—10)

This invention relates broadly to the advertising and display of articles of merchandise which are offered for sale and, more particularly, to the devices which bear a trademark or advertising matter or other identifying wording and are adapted and intended to be attached to such an article of merchandise.

A principal object of the invention has been to provide an advertising and display device in the form and nature of a card which is so constructed and devised that it may be quickly assembled with any article or device which is displayed and which may be easily and quickly removed therefrom by the purchaser or user after it has fulfilled its purpose. A further principal object of the invention has been to provide a device for use in advertising or displaying an article of merchandise, having spaced parts which are constructed and adapted to receive and be releaseably mounted on spaced parts of the article of merchandise whereby the advertising and display device is securely but releaseably attached to the article. A still further object of the invention has been to provide a device which is useful in the advertising and display of articles of manufacture and merchandise and which is in the nature and form of a card which may be easily and cheaply manufactured and may be easily attached to the article or device with which it is to be associated, and which is of novel construction and appearance and is attractive to the eye when assembled with an article or device, thereby effectively increasing the salability of the article or device.

Other objects and features of novelty of the invention will be made apparent by the following specification and the drawings which form part thereof, in which drawings:

Fig. 1 is a top plan view of an advertising and display device according to the invention, being shown as assembled with an article of manufacture, which is shown in dotted lines;

Fig. 2 is a sectional view taken on line 2—2 of Fig. 1;

Fig. 3 is a perspective view of the advertising and display device disclosed in Fig. 1;

Fig. 4 is a sectional view taken on line 4—4 of Fig. 3;

Fig. 5 is a perspective view of a second embodiment of the invention;

Fig. 6 is a sectional view taken on line 6—6 of Fig. 5, and

Figs. 7, 8, 9, 10, 11 and 12 are perspective views of further embodiments of the invention.

My invention provides a device for use in advertising or displaying any article of manufacture having two spaced parts between and on which the advertising or display device may be mounted and supported. Such an article of manufacture may, for example, be an extensible holder for containers such as casseroles and the like, such as I have described and claimed in my co-pending application Serial No. 635046, and an embodiment of which is illustrated in dotted lines in Fig. 1 of the drawings forming part of this specification. This holder comprises, generally, two spaced parallel pairs of side bars, which are shown at 2, 4. The bars of each pair are in close, parallel, side-by-side longitudinally sliding relation to each other and form part of two facing, relatively movable frame members, each of which comprises upwardly and outwardly extending members 6, 8, a handle 10 and a container engaging part 12.

A helical coil spring 14 surrounds each pair of side bars and extends longitudinally thereof to constantly urge the two frame members toward each other, and by closely confining the side bars of each pair, to permit only straight-line movement of the two frame members with respect to each other and to provide torsional and lateral stability and rigidity to the entire device, all of which is more fully described in my co-pending application which is referred to above. It will be seen that the two pairs of side bars, each with its surrounding and confining spring, constitute two parallel, spaced members between and on which an advertising and display device according to this invention may be mounted and supported.

The advertising and display device provided by this invention comprises, in general, a flat, planar body part having upper and lower surfaces and spaced side edge parts extending along each side edge of the body part. The upper and lower surfaces of each side edge part, to a depth thereof approximating the median plane of the body part, are displaced outwardly from the plane of the body part, thus forming an elongated means at each side edge of the body part extending along substantially the entire length thereof and within which the spaced, elongated parts of an article of manufacture may be received to support the advertising and display device.

One embodiment of an advertising and display device according to the invention is disclosed in Figs. 1 to 4 of the drawings and comprises a substantially rectangular card indicated generally at 20 and being formed of two plies 22, 24 of substantially equal area formed of relatively stiff paper, cardboard, plastic or other suitable material. These two plies are disposed in abutting face-to-face contact and attached together by any suitable means, such as the staples 26, which are spaced inwardly from the side edge parts 28, 30, 32, 34 of the superposed plies. These two plies form a generally flat, planar body part having spaced side edge parts lying outside of the connecting means 26. Each of these side edge parts is turned outwardly, throughout its entire length and to a relatively narrow width, at an obtuse angle to the plane of the body part of the card, whereby the upper and lower side edge parts at each side of the card form a dihedral angle extending longitudinally of the body part outside the means 26, which attach the two plies together. The two outwardly-turned plies at each side of the body part provide means at the side edges of the device for receiving an elongated member, such as one of the assemblies 2, 4 of side bars and confining springs described hereinbefore as forming parts of the article of manufacture shown in dotted lines in Figs. 1 and 2.

A second constructional embodiment of the invention is disclosed in Figs. 5 and 6 of the drawings and comprises a single-ply, elongated sheet of foldable material such as paper, cardboard, plastic or the like which is folded about a transverse line 31 midway between its ends to form a device having two plies 33, 35 of substantially equal area arranged in superposed face-to-face relation and connected together adjacent their free ends, which are the ends opposite the fold line 31, by suitable means such as the staples 36. Each of the side edge parts 38, 40, 42, 44 of the two plies 33, 35 is turned outwardly throughout its length at an obtuse angle to the plane of the body part of the device whereby the edge parts at each side of the device form a dihedral angle extending throughout the length of the device. If desired, the corners of the device may be cut off as shown at 50.

While it is preferred that a device according to the invention be formed by connecting two plies in abutting, face-to-face relation, as described hereinbefore, it is also contemplated by the invention that a device according to the invention may be formed from a single ply of material, and such an embodiment of the invention is disclosed in Fig. 7 of the drawings. Such a device may be formed of a single ply 70 of relatively thick cardboard or like material which may be split or cut along its side edges and between its upper and lower faces, as shown at 72, 74, thus forming side edge parts 76, 78, at one side of the card and side edge parts 80, 82 at its other side. Each side edge part is turned outwardly at an obtuse angle to the plane of the card and the side edge parts at each side of the card therefore form a dihedral angle extending throughout the length of the card as in the embodiments of the invention described hereinbefore.

While it is preferred that the side edge parts of the advertising and display devices according to the invention be turned outwardly at an obtuse angle to the planar body part to form a dihedral angle at each side of the device, it is also contemplated by the invention that the side edge parts at each side of the device may not form a dihedral angle but may be otherwise related. For example, as shown in Fig. 8, each side edge part may be arcuately and outwardly curved, as shown at 90, thus forming an elongated means of substantially circular cross-section at each side of the device within which the spaced, elongated parts of an article of manufacture may be received. Instead of being arcuate in cross-sectional shape, as in the embodiment shown in Fig. 8, the side parts of the advertising and display card may be turned first at right angles to the planar body part of the card and then outwardly, as shown at 94 and 96 in Fig. 9, to provide elongated side parts, each of which is substantially rectangular in cross-section and having an open outer side whereby the side parts may receive the spaced, elongated parts of an article of manufacture.

In a further possible embodiment of the invention one of the two side edge parts at each side of the card may be formed separately from the main body part of the card, which body part includes the other of the two side edge parts. An example of such an embodiment of the invention is disclosed in Fig. 10 and comprises an advertising and display device having a main body part 100 of planar construction having side edge parts 102 each of which is turned outwardly at an obtuse angle to the main body part 100. A narrow, separate, elongated piece 104 is attached to each side edge of the body part on that face thereof opposite to the face toward which the side edge parts 102 are turned, and the outer side part 106 of each of these pieces 104 is turned outwardly at an obtuse angle to the plane of the body part 100, whereby the parts 102, 106 form a dihedral angle at each side edge of the device.

The side edge parts of the device which receive the spaced parts of an article of manufacture need not be continuous from end to end, as in the forms of the invention which have been described, but within the scope of the invention may be discontinuous. Such an embodiment of the invention is disclosed in Figure 11 of the drawings and comprises a flat body part 110 formed of two superposed, abutting plies 112, 114 connected by suitable means such as the staples 116. The side edge parts 118 of ply 112 are formed into parts 120 which are spaced along the length of the card by cutting out intervening parts, as at 122, and each of these parts 120 is turned outwardly at an obtuse angle to the plane of the body part 110. The side edge parts 130 of the ply 114 are similarly formed with alternating outwardly turned parts 132 and cut-out parts 134, the parts 132 being preferably, but not necessarily, opposite the cut-out parts 122 of the side edge part 118 of ply 112. The parts 120 and 132 form a dihedral angle at each side of the card within which the spaced, parallel parts of an article of merchandise may be received.

A still further embodiment of the invention is disclosed in Fig. 12 and comprises a single ply of material having a flat body part 140 and, at each side of the body part, a plurality of side edge parts 142 which are alternately turned in opposite directions, each at an obtuse angle, to the body part of the card.

In the manufacture of any embodiment of my invention the material from which the device is formed should have sufficient stiffness to cause the device to be self-supporting when suspended between two spaced, parallel, elongated members such as rods, bars, springs or the edge parts of two spaced members, and I have found that kraft paper, cardboard and the like provide excellent results. In the use of an advertising and display device according to the invention any desired marking or wording such, for example, as a trademark, advertising wording or pictures, the name of the manufacturer, and the like, may be placed on one or both faces of the device, as shown at 60 in Figure 1, by printing or in any other suitable manner. The card is then assembled to the article or device with which it is to be displayed, by causing the angularly-related edge parts at each side of the device to receive one of the two spaced, parallel parts of the article or device, as shown in Figures 1 and 2, thus securely but removably attaching the advertising and display card to the article or device. I have found that such an advertising and display card, being attached to an article offered for sale in a novel manner, attracts attention to the article and promotes and increases the sale thereof. The purchaser of the article may, of course, easily and quickly remove the display card from the article, after which the card advertises the article to anyone into whose hands it may come.

While I have described the invention as being formed from foldable paper, cardboard or like material folded to form a dihedral angle at each side thereof, it will be apparent that a device according to the invention may be cast or molded from a plastic or other suitable material.

While I have described and illustrated in this specification certain embodiments of my invention, it will be apparent to those skilled in the art that other embodiments, as well as modifications of those disclosed, may be made and practised without departing in any way from the spirit and scope of the invention, for the limits of which reference must be made to the appended claims.

What is claimed is:

1. An advertising and display device constructed and adapted to be mounted on and in between two spaced parallel parts of an article of manufacture, comprising a planar body part and spaced parallel side edge parts which have upper and lower parts disposed on opposite sides of the median plane of the body part and being coextensive with the side edge parts, said upper and lower parts of each of said side edge parts being turned outwardly in opposite directions from the median plane of the planar body part to form at each side of the device an edge member having opposed parts for receiving between them one of the spaced parts of the article of manufacture.

2. An advertising and display device according to claim 1, in which each of the outwardly turned upper and lower parts of each side edge part is disposed at an obtuse angle to the plane of the body part and the upper and lower parts at each side edge of the device form a dihedral angle.

3. An advertising and display device according to claim 1 in which the body part and its side edge parts are formed of a single piece of molded material.

References Cited in the file of this patent

UNITED STATES PATENTS

| 2,119,751 | Nichols | June 7, 1938 |
| 2,632,268 | Schroeder | Mar. 24, 1953 |
| 2,660,823 | Dubin et al. | Dec. 1, 1953 |

FOREIGN PATENTS

| 14,302 | Great Britain | July 11, 1905 |